(12) United States Patent
Fesseler

(10) Patent No.: US 12,499,744 B2
(45) Date of Patent: Dec. 16, 2025

(54) OPERATING UNIT AND A METHOD FOR OPERATING A PLANT WITH AN OPERATING UNIT

(71) Applicant: ACD Antriebstechnik GmbH, Achstetten (DE)

(72) Inventor: Aaron Fesseler, Achstetten (DE)

(73) Assignee: ACD Antriebstechnik GmbH, Achstette (DE)

( * ) Notice: Subject to any disclaimer, the term of this patent is extended or adjusted under 35 U.S.C. 154(b) by 109 days.

(21) Appl. No.: 18/538,642

(22) Filed: Dec. 13, 2023

(65) Prior Publication Data

US 2024/0282185 A1    Aug. 22, 2024

(30) Foreign Application Priority Data

Feb. 17, 2023    (LU) ........................................ 503513

(51) Int. Cl.
  *G08B 21/02*    (2006.01)
  *G08B 21/18*    (2006.01)
(52) U.S. Cl.
  CPC ............. *G08B 21/02* (2013.01); *G08B 21/18* (2013.01)
(58) Field of Classification Search
  CPC .................................. G08B 21/02; G08B 21/18
  USPC ........................................................ 340/540
  See application file for complete search history.

(56) References Cited

U.S. PATENT DOCUMENTS

| | | | |
|---|---|---|---|
| 6,167,464 A | 12/2000 | Kretschmann | |
| 9,195,384 B2* | 11/2015 | Fuhrmann, Jr. | G06F 3/04847 |
| 10,114,535 B2* | 10/2018 | Fuhrmann, Jr. | G06F 3/04847 |
| 10,656,816 B2* | 5/2020 | Fuhrmann, Jr. | G09G 5/14 |
| 2007/0078615 A1* | 4/2007 | Rieger | G08C 17/02 |
| | | | 702/63 |
| 2009/0115400 A1* | 5/2009 | Hunter | G01R 15/183 |
| | | | 340/664 |
| 2012/0114158 A1* | 5/2012 | Gysin | H04R 25/554 |
| | | | 381/315 |
| 2015/0035834 A1* | 2/2015 | Axness | G01D 7/08 |
| | | | 345/440 |
| 2015/0040051 A1* | 2/2015 | Fuhrmann, Jr. | G05B 23/0272 |
| | | | 715/771 |
| 2015/0186483 A1* | 7/2015 | Tappan | G05B 19/4063 |
| | | | 707/737 |

(Continued)

FOREIGN PATENT DOCUMENTS

| | | |
|---|---|---|
| DE | 102013220865 A1 | 4/2015 |
| DE | 202020105750 U1 | 1/2022 |

(Continued)

*Primary Examiner* — Zhen Y Wu
(74) *Attorney, Agent, or Firm* — 24IP Law Group USA, PLLC; Timothy R DeWitt

(57) ABSTRACT

An operating unit and a method for operating a plant with an operating unit. The operating unit comprises a communication port configured to provide communication between the operating unit and at least one plant, an indicator unit provided at the operating unit and configured to output a state of the plant, and safety electronics comprising at least one safe input and at least one safe output, wherein the safety electronics are connected to the indicator unit via the at least one safe output and are connected to a detection element via the at least one safe input, wherein the detection element detects an output of the indicator unit.

21 Claims, 9 Drawing Sheets

(56) References Cited

U.S. PATENT DOCUMENTS

| | | | |
|---|---|---|---|
| 2016/0018961 A1* | 1/2016 | Williams | G05B 23/024 |
| | | | 715/772 |
| 2016/0054289 A1* | 2/2016 | O'Donnell | G01N 33/2888 |
| | | | 702/22 |
| 2017/0126843 A1* | 5/2017 | Pantea | G06F 9/4415 |
| 2018/0088098 A1* | 3/2018 | Mandava | G01K 1/022 |
| 2021/0286338 A1* | 9/2021 | Karako | G05B 19/406 |
| 2023/0106122 A1* | 4/2023 | Peterson | G05B 19/418 |
| | | | 700/19 |

FOREIGN PATENT DOCUMENTS

| | | |
|---|---|---|
| EP | 1233316 A2 | 8/2002 |
| WO | 2017139817 A1 | 8/2017 |
| WO | 2022258575 A1 | 12/2022 |

* cited by examiner

OPERATING UNIT AND A METHOD FOR OPERATING A PLANT WITH AN OPERATING UNIT

CROSS REFERENCE TO RELATED APPLICATIONS

This application claims priority from the Luxembourg patent application LU 503 513, filed on 17 Feb. 2023. Luxembourg patent application LU 503 513 is hereby incorporated by reference herein in its entirety.

BACKGROUND OF THE INVENTION

Field of the Invention

The field of the invention relates in general to safety technology in mechanical engineering and in particular to signal or indicator lights at an operating unit (human-machine interface).

Brief Description of the Related Art

Plants or facilities and (electric) machines can pose risks which are so dangerous that humans and the environment must not be exposed to them under any circumstances. If such a danger is present, the existing risks must be reduced in order to take account of the safety need. In order to make the risk reduction quantifiable, two variables, the safety integrity level (SIL) and the performance level (PL), can be used.

The SIL is standardized in the international standardization according to IEC 61508/IEC61511 and describes a value for the probability that a safety-related function satisfactorily fulfills the required safety functions under all specified conditions within a specific time period. The SIL comprises three discrete stages from SIL 1—lowest risk reduction to SIL 3—highest risk reduction.

The PL is a value which describes the capability of safety-related parts of controllers which execute a safety function under specified conditions. The PL in this case ranges from PL a—lowest risk reduction to PL e—highest risk reduction.

The relationship between SIL and PL is described in the standard ISO 13849-1:2006. The higher the SIL or the PL of a safety-related system, the lower the probability that the system does not execute the required safety function.

In order to achieve a higher SIL value or PL value and thus a higher safety level, so-called signal or indicator lights are frequently used in plant engineering or mechanical engineering. Such lights clearly show a functional or danger state through different types of lights in corresponding colors or color combinations.

Corresponding standards exist for such lights and their applications, in which the appearance and functions are defined with significance of colors, such as the standards EN 60073. EN 60073 is a European standard for the classification of electric machines, which defines the requirements for the design, the protection class and the insulation class of electric plants or facilities or machines.

For this purpose, the indicator lights are monitored, whereby a high safety standard—high SIL or PL—is to be achieved and thus the risk for life and limb is to be reduced. A maximum safety standard means, for example, that no more than one fault may occur without functional restriction and that this fault is reliably, i.e. 100 percent, detected by the safety-related system. The design of such safety-related systems includes a risk analysis in which multi-channel capability, dynamization, degree of redundancy and so on are defined. This should enable the safety-related system to react to unforeseen situations or faults without jeopardizing the safety and reliability of the system.

The lights can be fixedly mounted at the machine, or else can be set up in a mobile manner via wired or wireless.

The indicator light visually indicates functions and dangers, whereby they have a particular significance in terms of safety technology. The indicator lights indicate potential dangers, which can lead to injuries up to death. An unreliable lighting can lead to fatal accidents in the case of a corresponding danger. Therefore, a safe lighting or safe non-lighting with corresponding color(s) and patterns, such as flashing or pulsing, must absolutely be ensured in order to guarantee the safety for body and life in any case.

A warning light column for visually displaying at least one operational state is known from DE 20 2020 105 750 U1.

EP 1 233 316 A2 discloses a device for operating automation components, in which available IT devices, such as PDAs or mobile telephones, are used as a simple HMI (human-machine interface) in order to make the operation more comfortable.

DE 10 2013 220 865 A1 discloses a method and system for remotely operating a machine tool via a mobile communication device.

U.S. Pat. No. 6,167,464 A discloses a mobile HMI for monitoring the actuation of a spatially distributed control system in a factory or the like and provides a position signal to a central processor.

In order to make the known indicator lights visible, they are often mounted at a higher position at the plant/machine. In this case, operators or persons in the environment of the machine must actively look in the direction of the indicator light in order to be able to obtain the current information about the state of the plant or machine. In the case of specific tasks, the visibility can be restricted, whereby in turn the risk of accidents is increased.

It is an object of the present application to increase the safety level in the operation of plants or machines. It is a further object of the present application to guarantee a safe lighting and safe non-lighting of the indicator light, above all in the operation of the plant via an operating unit. It is a further object of the present application to achieve highest SIL/PL values.

SUMMARY OF THE INVENTION

This object is achieved by an operating unit for operating at least one plant or facility or machine from a plurality of plants or facilities or machines. The operating unit comprises a communication port for connecting the operating unit to the at least one plant, wherein the communication port is configured to provide communication between the operating unit and at least one plant, an indicator unit or reporting unit or signal unit for outputting and for continuous repeated further outputting, wherein the indicator unit is provided at the operating unit and configured to output a state of the plant, and safety electronics for monitoring the indicator unit during outputting the state of the at least one plant, wherein the safety electronics comprise at least one safe input and at least one safe output, wherein the safety electronics are connected to the indicator unit via the at least one safe output and are connected to a detection element via the at least one safe input. The detection element is configured to detect an output of the indicator unit. The state comprises at least one of a functional state, a danger state, and a position state.

This results in the advantage that the indicator unit is monitored by safety electronics, whereby the highest SIL value (SIL 3) or PL value (PL e) can be achieved. A further advantage is that the indicator unit is provided directly at the operating unit and is thus always in the field of view of the operator who can move around the plant.

According to a first aspect, the safety electronics are connected to the indicator unit with the safe output via a feedback or recirculation in a single-channel or multi-channel manner and to the detection element with the safe input in a single-channel or multi-channel manner for evaluation.

As a result, it can be ensured via the safety electronics that the connection and the function of the indicator unit and of the detection element can be reliably monitored with the safety electronics and connection terminations can be detected, whereby a safe lighting and non-lighting of the indicator light can be guaranteed.

According to a further aspect, the indicator unit comprises at least one signal transducer.

As a result, feedback about the state of the plant can be output to the operator in real time via the operating unit, whereby the safety level is increased, and thus highest SIL/PL values can be achieved.

According to a further aspect, each of the at least one of the signal transducer is respectively connected to the safety electronics via at least one safe output.

The connection to each individual one of the signal transducer is thereby securely set up, whereby the highest SIL value (SIL 3) or PL value (PL e) can be achieved.

According to a further aspect, the at least one signal transducer comprises at least one of a lamp or illuminant, an acoustic transducer and a vibration transducer.

The state of the plant can thereby be output to the operator individually or in combination via light, noise or vibration in order to further increase the safety level and thus achieve highest SIL/PL values.

According to a further aspect, the lamp comprises a single lamp or a combined lamp.

Requirements of a plant system and all specifications from relevant standards with regard to a lamp can be taken into account and implemented with this lamp.

According to a further aspect, the indicator unit outputs the functional state, the danger state and the position state of the at least one plant with one of lighting information, acoustic information and vibration information.

The safety level is thereby increased, and highest SIL/PL values can be achieved.

According to a further aspect, the detection element comprises at least one signal detector, wherein the number of signal detectors may differ from the number of signal transducers.

It is thereby possible for a single signal detector to detect the output of multiple signal transducers, or for multiple signal detectors to detect the output of one signal transducer. The safety level can thus be adapted to the present circumstances, costs can be reduced if required and a high safety level can be ensured.

According to a further aspect, the at least one signal detector comprises at least one of a photoresistor, a photodiode, a phototransistor, an acoustic sensor and a vibration sensor.

The detection element can thereby detect light signals, acoustic signals and vibration signals.

According to a further aspect, each signal detector is respectively connected to the safety electronics via at least one safe input.

The connection to each signal detector of the detection element is thereby securely monitored, whereby the highest SIL value (SIL 3) or PL value (PL e) can be achieved.

According to a further aspect, the operating unit can be a component independent of the at least one plant or a part of the plant.

The power supply of the operating unit can thereby be provided on the one hand by the plant, externally via a power cable or self-sufficiently via a battery.

According to a further aspect, the communication port communicates with the at least one plant in a wireless or wired manner.

The operator of the operating unit can thereby move freely in the environment of the plant on the one hand.

According to a further aspect, the operating unit comprises at least one operating element configured to operate the operating unit and a display configured to display information about a state of the at least one plant and information about a state of the operating unit.

The operator can thereby operate the plant entirely via the operating unit and has all relevant information of the plant and of the operating unit displayed.

The above-mentioned object is further achieved by a method for operating at least one plant from a plurality of plants with the above-described operating unit. The method comprises connecting the operating unit to the at least one plant via a communication port of the operating unit, outputting a state of the at least one plant comprising one of a functional state, a danger state, and a position state via an indicator unit of the operating unit as at least one of lighting information, acoustic information, and vibration information, operating the at least one plant via the operating unit, and further outputting a state of the at least one plant comprising one of the functional state, the danger state, and the position state via the indicator unit as at least one of the lighting information, acoustic information and vibration information, wherein the further outputting is continuously repeated during the connection between the operating unit and the at least one plant and wherein the indicator unit is monitored via safety electronics of the operating unit during the further outputting. The safety electronics thereby comprise a safe input and a safe output and the indicator unit is connected to the safety electronics via the at least one safe output.

According to one aspect, the method further comprises informing about a connection termination of the operating unit to the at least one plant via the indicator unit of the operating unit and independently transitioning the at least one plant into a safe state upon connection termination of the at least one plant to the operating unit, wherein the informing is performed with a signal different from a signal reflecting the functional state, the danger state and the position state of the at least one plant.

This results in the advantage that operation of at least one plant is monitored, whereby the highest SIL value (SIL 3) or PL value (PL e) can be achieved.

According to a further aspect, the connecting is performed via a wired or wireless communication.

As a result, the operating device can be used in a mobile manner in the sense that the operating device can easily connect to a plant from a plurality of plants.

According to a further aspect, the outputting is monitored via the safety electronics via a control and a feedback of a signal to the indicator unit.

The highest SIL value (SIL 3) or PL value (PL e) can thereby be achieved.

According to a further aspect, the outputting comprises information which comprises leaving of the operating unit a locally permissible area for the connection between the operating unit and the plant.

It is thereby ensured that the operator is located in a predetermined locally permissible area of the plant to be operated in order to ensure the safety of the operation.

According to a further aspect, the method further comprises monitoring the indicator unit via the safe output of the safety electronics of the operating unit.

By monitoring the indicator unit, a high safety standard—high SIL or PL—can be achieved.

According to a further aspect, the method further comprises informing about a connection establishment or a connection termination between the operating unit and the at least one plant by the indicator unit.

The above-mentioned object is further achieved by the use of the above-described operating unit for at least one plant from a plurality of plants.

Multiple plants in a manufacturing environment, such as a manufacturing hall, can thereby be operated with the operating unit, whereby the productivity can be increased, and the costs can be reduced.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

DESCRIPTION OF THE FIGURES

A more complete understanding of the invention and of many advantages associated therewith is easily achieved when this is considered by reference to the following detailed description in conjunction with the accompanying Figures.

DETAILED DESCRIPTION OF THE INVENTION

The invention will now be described with reference to the Figures. It goes without saying that the aspects of the invention described here are only examples and in no way limit the scope of protection of the claims. The invention is defined by the claims and their equivalents. It goes without saying that features of one aspect of the invention can be combined with a feature of another aspect or other aspects of the invention, provided that they are not mutually exclusive.

Figure 1:
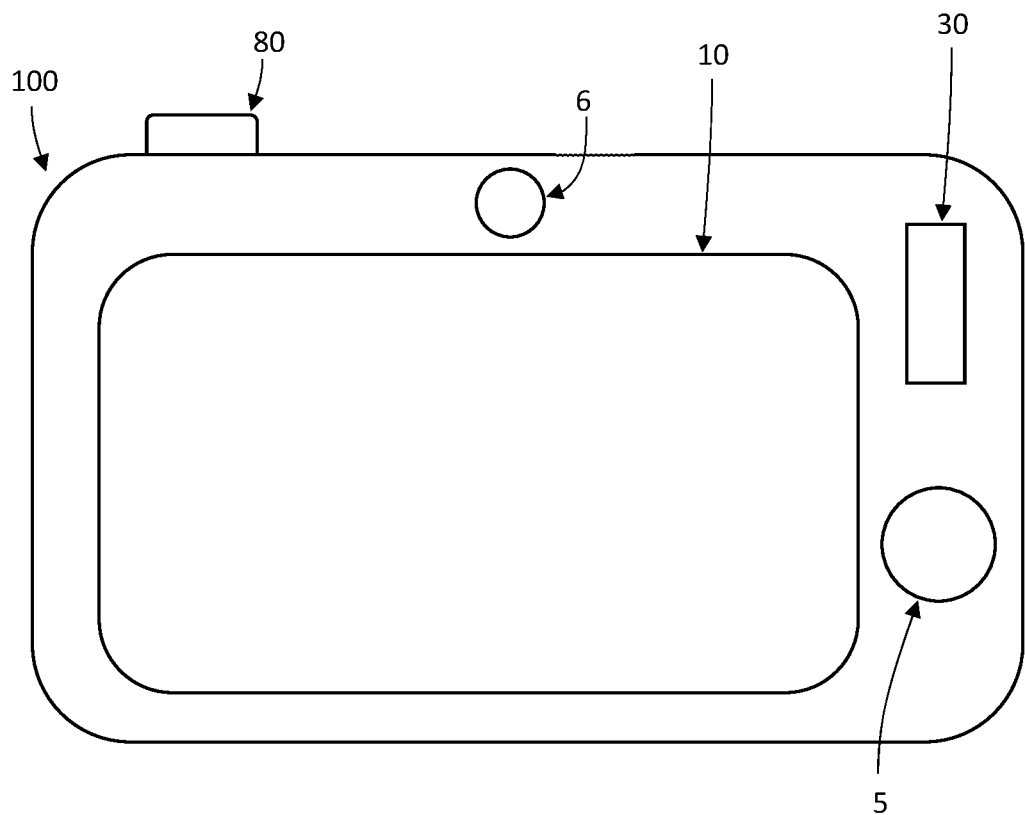
FIG. 1 is a schematic illustration of an operating unit corresponding to a first embodiment.

FIG. 1 shows a schematic illustration of an operating unit 100 corresponding to a first embodiment. The operating unit 100 is illustrated from the point of view of an operator who can operate a plant or facility or machine 90 with the operating unit 100. The operating unit 100 comprises a display 10, a first and second operating element 5, 6, an indicator unit 30 and a communication port 80.

The indicator unit 30 is provided at the operating unit 100 and is configured to output a state of the plant 90. The state of the plant 90 comprises at least one of a functional state, a danger state and a position state. Further, the indicator unit 30 can inform about a connection termination or communication termination of the operating unit 100 to the plant 90. A connection termination occurs when the communication port 80 loses the connection/communication to the previously connected plant 90.

However, the indicator unit 30 can also provide information about a connection establishment or communication establishment or a pairing of the operating unit 100 with the plant 90. For this purpose, the indicator unit 30 can be used to provide feedback about the pairing to an operator operating the at least one plant 90 by the operating unit 100. In this case, in a non-limiting example, the indicator unit 30 can signal a lighting that is coordinated with the indicator light (not shown) attached to the plant 90 to be connected in order to visually display the selected plant 90 from a plurality of plants 90 to the operator. In a non-limiting example, the coordinated lighting may comprise a flashing and/or a specific color pattern. In another non-limiting example, the operating unit 100 may display the pairing between the operating unit 100 and the plant 90 by the indicator unit 30.

The communication port 80 is configured to provide communication or connection or pairing between the operating unit 100 and at least one plant 90. The communication is performed in real time or at intervals in the millisecond range. The communication port 80 can communicate or be connected to the plant 90 in a wired or wireless manner. The connecting of the operating unit 100 to the plant 90 comprises the communication of the operating unit 100 with the plant 90. The operating unit 100 can further be a component independent of the plant 90 or a part of the plant 90. If the operating unit 100 is a component independent of the plant 90 and the operating unit 100 communicates/connects with/to the plant 90 in a wireless manner, the operating unit 100 can be regarded as a mobile operating unit in this example. In this example, the operating unit 100 can obtain electric power via a battery or a power cable, wherein the power cable is connected to a different power source than the plant 90. In another example, the operating unit 100 can be regarded as a semi-mobile operating unit if the operating unit 100 communicates/is connected with/to the plant 90 in a wired manner, wherein at least one of the communication via the communication port 80 or the power supply is provided via a fixed line. In a further example, the operating unit 100 can be regarded as a stationary operating unit if the operating unit 100 is provided as a part of the plant 90. In this example, the operating unit 100 is fixedly mounted at the plant and is supplied with electric power by the plant 90. The communication of the stationary operating unit with the plant 90 can be performed in this example in a wireless or wired manner. For wireless communication, all known standards, such as for example Wi-Fi, Zigbee, Thread, Bluetooth, LTE, 5G and so on, can be used.

The first operating element 5 and the second operating element 6 are configured to operate the operating unit 100. In particular, an operator of the plant 90 can operate the plant 90 via the operating elements 5, 6 of the operating unit 100. The first operating element 5 is for example one of an emergency halt, an emergency shut-off and an emergency stop. The operator can stop the plant 90 via the first operating element 5 as quickly as possible depending on a state of the plant 90, stop it in normal operation or switch off the electric power supply of the plant 90. The first operating element 5 is thus a component known from the prior art. The second operating element 6 is a component with which commands and settings on the display 10 can be selected and controlled. In an example in which the second operating element 6 is omitted, the display 10 comprises a touch screen. In a further example, the display 10 can be a component of a tablet (not illustrated), wherein the tablet can communicate with the plant 90 via its own communication path, such as for example LAN, WLAN and so on. In this example, the plant 90 can be configured and operated via the tablet, but without achieving the highest safety levels and consequently the highest SIL/PL values by the tablet alone.

Figure 2:
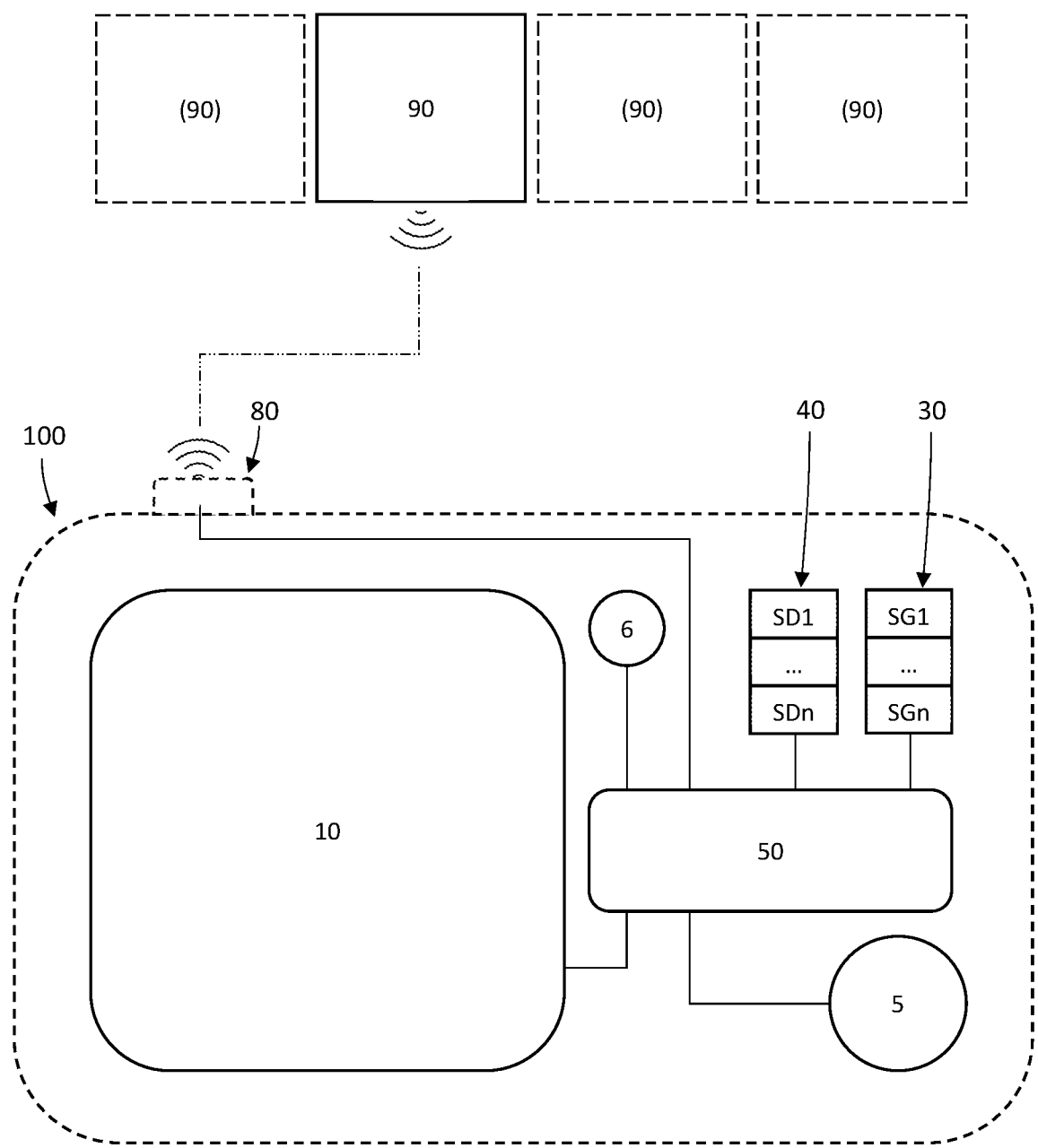
FIG. 2 illustrates a schematic structure of the operating unit 100 from FIG. 1, in communication with a plant.

FIG. 2 illustrates a schematic structure of the operating unit 100 from FIG. 1, which is connected to a plant 90 from a plurality of plants 90 and communicates therewith. The connection of the operating unit 100 with the plant 90 is performed via the communication port 80. The operating unit 100 can be used to connect to one from multiple plants and to communicate therewith. The selection of which plant 90 from the plurality of plants 90 the operating unit 100 is to connect to can be selected via the operating unit 100.

As can be seen, a schematic structure of the operating unit 100 is illustrated. The operating unit 100 comprises safety electronics 50, which are electronically connected to the display 10, the first and second operating element 5, 6, the indicator unit 30 and a detection element 40.

The indicator unit 30 comprises at least one signal transducer SG=SG1. The indicator unit 30 can also comprise two signal transducers SG=SG1 and SG2 or a plurality of signal transducers SG1, . . . , SGn, wherein SGn represents an n-fold number of signal transducers. For example, the indicator unit 30 comprises the signal transducers SG1, SG2, SG3 and SG4 in the case of n=4 signal transducers. In a further example, the indicator unit 30 comprises the signal transducers SG1, SG2, SG3, SG4, SG5 and SG6 in the case of n=6 signal transducers.

The at least one signal transducer SG1 . . . , SGn comprises at least one of a lamp, an acoustic transducer and a vibration transducer, wherein the lamp comprises a single lamp or a combined lamp. Single lamps are for example lights or single LEDs (light-emitting diodes). Combined lamps are for example multiple cumulated or grouped individual LEDs. The LEDs can light in different colors or reflect different colors (RGB LEDs). The indicator unit 30 can thus output the functional state, the danger state and the position state of the plant 90 with one of lighting information, acoustic information and vibration information. The indicator unit 30 is provided at the operating unit 100 and configured such that the operator of the operating unit 100 can see the output of the indicator unit 30 well as lighting information, can feel it well as vibration information and can hear it well as acoustic information. In an example in which the indicator unit comprises three signal transducers SG1, SG2 and SG3, and each of the three signal transducers SG1, SG2 and SG3 are lamps, the indicator unit 30 can output a state of the plant 90 by means of lighting information in order to indicate the state of the plant 90 to the operator. In a further example in which a lamp is provided as the first signal transducer SG1 and an acoustic transducer is provided as the second signal transducer SG2, the indicator unit 30 can output a state of the plant 90 by means of lighting information and acoustic information in order to indicate the state of the plant 90 to the operator. If a vibration transducer is used as the signal transducer of the indicator unit 30, vibration information can correspondingly be output.

Each of the lighting information, acoustic information and vibration information can be determined by the number of signal transducers SG1, . . . , SGn and the safety electronics 50. The safety electronics 50 control the indicator unit 30 for example by regulating the brightness and color of the lamp, the frequency and amplitude of the acoustic transducer and the strength of the vibration transducer, as will be explained in detail later.

The detection element 40 comprises at least one signal detector SD=SD1. The detection element 40 can also comprise two signal detectors SD=SD1 and SD2 or a plurality of signal detectors SD1, . . . , SDn, wherein SDn represents an n-fold number of signal detectors. For example, the detection element 40 comprises the signal detector SD1, SD2, SD3 and SD4 for n=4 signal detectors. In a further example, the detection element 40 comprises the signal detector SD1, SD2, SD3, SD4, SD5 and SD6 for n=6 signal detectors. The number of signal detectors SD1, . . . , SDn may differ from the number of signal transducers SG1, . . . , SGn. As signal detectors SD1, . . . , SDn, the detection element 40 comprises any type of detectors for detecting the information or output output by the signal transducers SG1, . . . , SGn. As a non-limiting example, one of the signal detectors SD1, . . . , SDn of the detection element 40 comprises at least one of a photoresistor, a photodiode, a phototransistor, an acoustic sensor, and a vibration sensor. In an example in which the signal transducer SG1, . . . , SGn outputs lighting information with a lamp, the detection element 40 can comprise a fiber optic cable LWL in order to conduct the lighting information via the fiber optic cable LWL to the signal detector SD1, . . . , SDn. The detection element 40 is provided at the operating unit 100 and configured to detect the output of the indicator unit 30. For this purpose, the detection element 40 can be provided in the operating unit 100 such that the operator cannot see the detection element 40.

Figure 3:
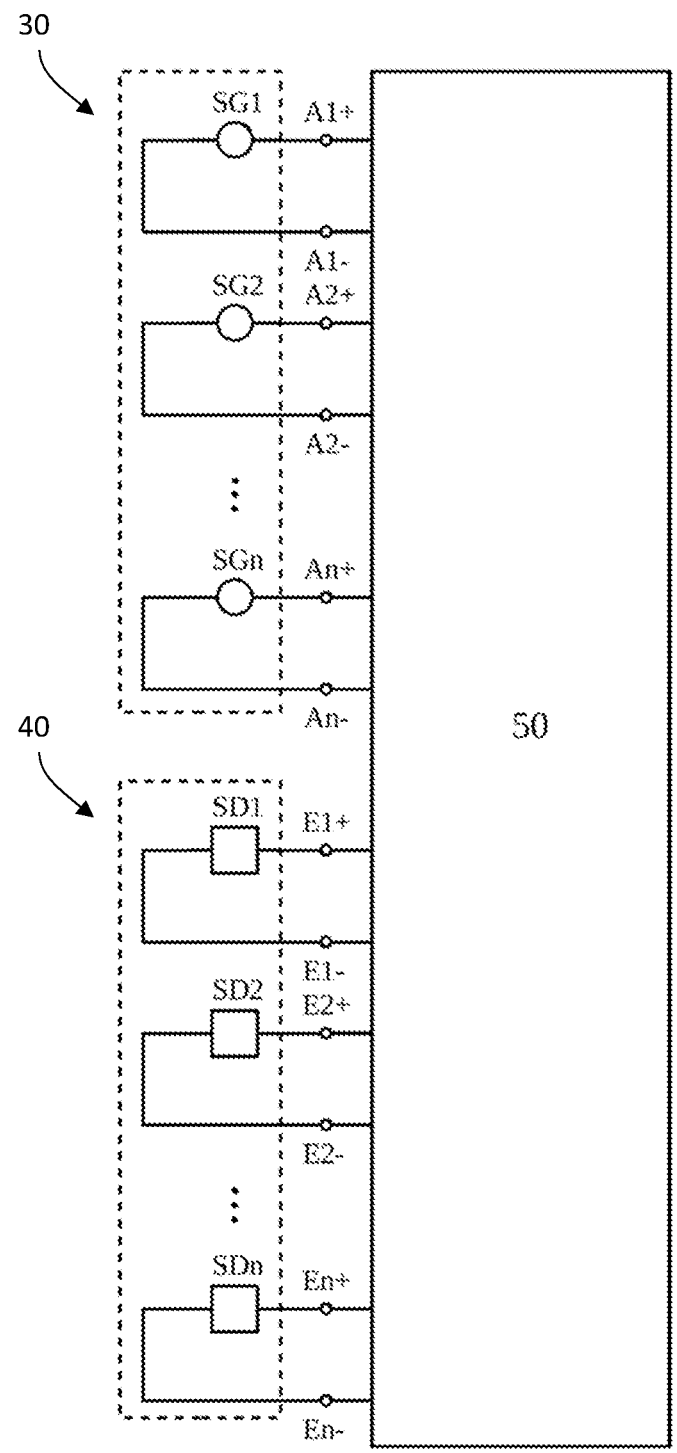
FIG. 3 is a schematic illustration of a connection between safety electronics and indicator unit or detection element.

FIG. 3 is a schematic illustration of a connection between safety electronics 50 and the indicator unit 30 or the detection element 40. The safety electronics 50 comprise at least one safe input E1+, E1−, . . . , En+, En− and at least one safe output A1+, A1−, . . . , An+, An−, wherein each of the safe input and safe output comprises a positive + and negative − strand. En+, En− or An+, An− represent an n-fold number of safe inputs or safe outputs. For example, the safe input comprises the safe inputs E1+, E1−, E2+, E2−, E3+, E3−, and E4+, E4− for n=4 safe inputs. In a further example, the safe input comprises the safe inputs E1+, E1−, E2+, E2−, E3+, E3−, E4+, E4−, E5+, E5−, and E6+, E6− for n=6 safe inputs. The same applies analogously to the safe output A1+, A1−, . . . , An+, An−.

The safety electronics 50 are connected to the detection element 40 via the at least one safe input E1+, E1−, . . . , En+, En−. The safety electronics 50 are connected to the indicator unit 30 via the at least one safe output A1+, A1−, . . . , An+, An−. The number of safe inputs E1+, E1−, . . . , En+, En− can depend on the number of signal detectors SD1, . . . , SDn of the detection element 40. The number of safe outputs A1+, A1−, . . . , An+, An− can depend on the number of signal transducers SG1 . . . , SGn of the indicator unit 30.

With reference to FIGS. 4A to 4D, examples of systems are described as to how a safe output A1+, A1−, . . . , An+, An− with feedbacks R1, R2 is provided via the connection between the safety electronics 50 and signal transducers of the indicator unit 30 in order to achieve a higher safety level or higher SIL/PL values. The safe output A1+, A1−, . . . , An+, An− with feedbacks R1, R2 in this case represents an output in the safety electronics 50 which, in the event of a fault, ensures that a signal, comprising current and/or voltage, at a safe output A1+, A1−, . . . , An+, An− is no longer output to one of the signal transducers SG1, . . . , SGn. Thus, for example, it can be detected via the feedbacks R1, R2 and the safety electronics 50 in an incident in which a fault is present at one of the switches S1, S2 that a signal is no longer output via the safe output A1+, A1−, . . . . An+, An− to one of the signal transducers SG1, . . . , SGn, whereby the plant 90 can be transferred into a safe state. The feedbacks R1, R2 can, for example, feed back a switching time, a time pulse for an "ON" switching or "OFF" switching of the switches S1, S2, a voltage level and so on as a signal alongside the current and/or the voltage or in addition to the current and/or the voltage. It is thereby possible to safely monitor the output or non-output of the at least one signal transducer SG1 . . . , SGn. It is thereby possible to avoid damage or dangerous situations and thus to increase the safety according to the SIL/PL values. The feedbacks R1, R2 can include from no information up to any number of information depending on the requirement. For example, with no information at all, the switches S1, S2 are not monitored by the feedbacks R1, R2, whereby no high safety values can be achieved.

The safety electronics 50 take over the control of the at least one signal transducer SG1, . . . , SGn of the indicator unit 30 and monitor by the feedbacks R1, R2 the output lighting information, acoustic information, and/or vibration information, such as for example the brightness and color in the lamp, the frequency and amplitude in the acoustic transducer and the strength in the vibration transducer. The individual signal transducers SG1, . . . , SGn are controlled with the aid of the safety electronics 50 via safe outputs A1+, A1−, . . . . An+, An−, wherein the control can take place in a single-channel manner with a channel K1 or in a multi-channel manner.

A single-channel or multi-channel control by the safety electronics 50 describes the number of independent safe outputs A1+, A1−, . . . , An+, An− which are used to control the individual signal transducers SG1, . . . , SGn. A single-channel control means that only a single safe output A1+, A1− is present for a signal transducer SG=SG1 in order to control the signal transducer SG. A multi-channel control on the other hand means that multiple independent safe outputs A1+, A1−, . . . , An+, An− are present which are assigned to each individual one of the signal transducers SG, . . . , SGn. The overall safety can be further increased by the feedbacks R1, R2 which ensure additional monitoring and safety.

Faults at the respective safe output A1+, A1−, . . . , An+, An− can be detected by the safe outputs A1+, A1−, . . . , An+, An− in combination with the feedbacks R1, R2 and a safe and reliably occurring reaction can be initiated in the relevant fault case, such as for example the safe switching off of the plant 90. A higher flexibility is thus created, and the reliability of the entire system is increased since there are multiple redundant safe outputs which can control and monitor the system.

It should be noted that a sole monitoring of the voltage and/or of the current at the at least one safe output A1+, A1−, . . . , An+, An− cannot provide a guaranteed safe statement about the function of the at least one signal transducer SG1, . . . , SGn. Thus, for example when a voltage or current is applied via the at least one safe output A1+, A1−, . . . , An+, An− to a lamp, the lighting due to a fault of the lamp can be absent. In a further example, when a voltage or current is applied to an acoustic transducer, the generation of acoustic information, such as a warning tone, can be absent due to a fault. In a further example, when a voltage or current is applied to a vibration transducer, the generation of vibration information due to a fault can be absent.

In order to be able to provide a safe statement about the function of the at least one signal transducer SG1, . . . , SGn, in addition to the monitoring of the voltage and/or of the current at the at least one safe output A1+, A1−, . . . . An+, An− a comparison with the signal is therefore carried out or monitored by the at least one signal detector SD1, . . . , SDn. It can thereby also be ensured that the at least one signal detector SD1, . . . , SDn detects the signal of the at least one signal transducer SG1, . . . , SGn and not an external signal. It is thus ensured in a non-limiting example that an acoustic signal of a foreign acoustic source does not influence the safe statement about the function of the acoustic transducer of the operating unit 100.

Figure 4A:
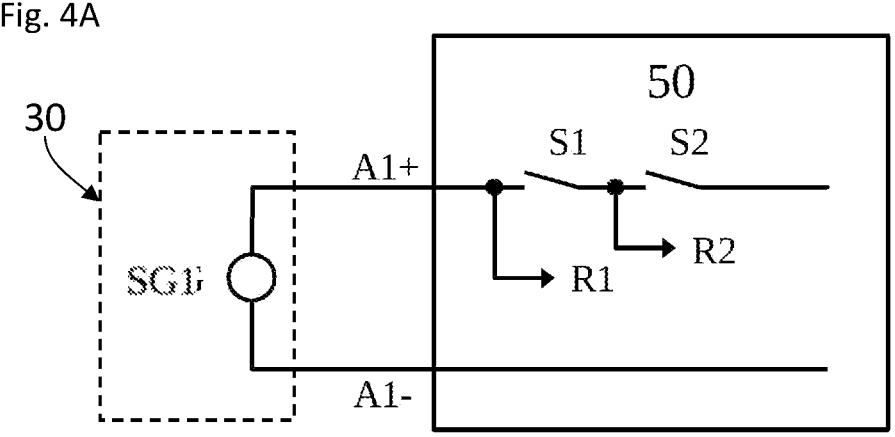
FIGS. 4A to 4D are schematic illustrations of the connection between safety electronics and the indicator unit.

FIG. 4A shows a first example of the connection between the safety electronics 50 and the indicator unit 30, in which the indicator unit 30 comprises only one signal transducer SG1. The one signal transducer SG is controlled by the safety electronics 50 in a two-channel manner via two switches S1, S2 connected in series. For this purpose, each of the two switches S1, S2 respectively comprises a feedback R1, R2 for monitoring. The safe output A1+, A1− according to the first example is thus defined by providing two switches S1, S2 in series and monitoring the switches S1, S2 via the feedback R1, R2 at the positive strand A1+ (of the safe output). In this first example, the output signal, comprising a voltage and/or a current, is fed back to the signal transducer SG via the feedbacks R1, R2, whereby a monitoring of the feedback circuit or a read-back of the switches S1, S2 occurs. If a ground fault occurs in this example (if An− falls to ground), it can still be switched off in a two-channel manner.

Figure 4B:
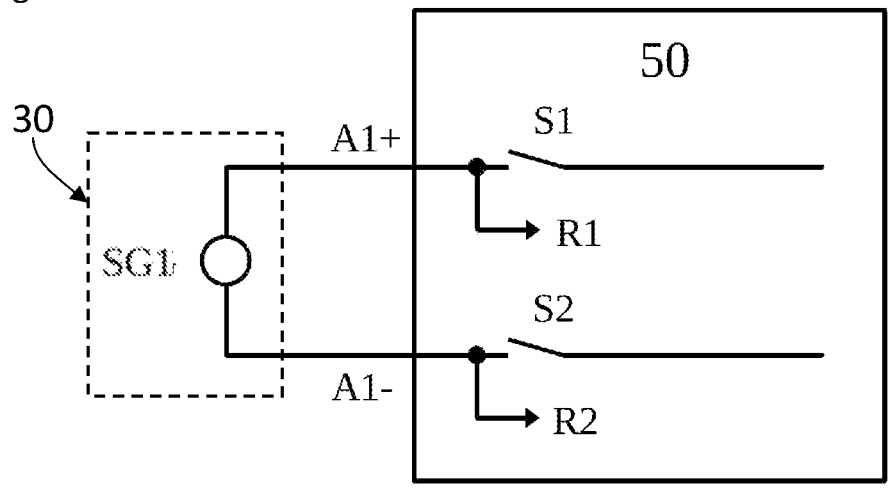

FIG. 4B shows a second example of the connection between the safety electronics 50 and the indicator unit 30, in which the indicator unit 30 likewise comprises only one signal transducer SG=SG1. Unlike in FIG. 4A, the switches S1, S2 in this example are respectively provided at the positive strand A1+ and negative strand A1− and are respectively monitored via the feedbacks R1, R2. In this example, a ground fault (if An− falls to ground) can no longer be switched off in a two-channel manner.

Figure 4C:
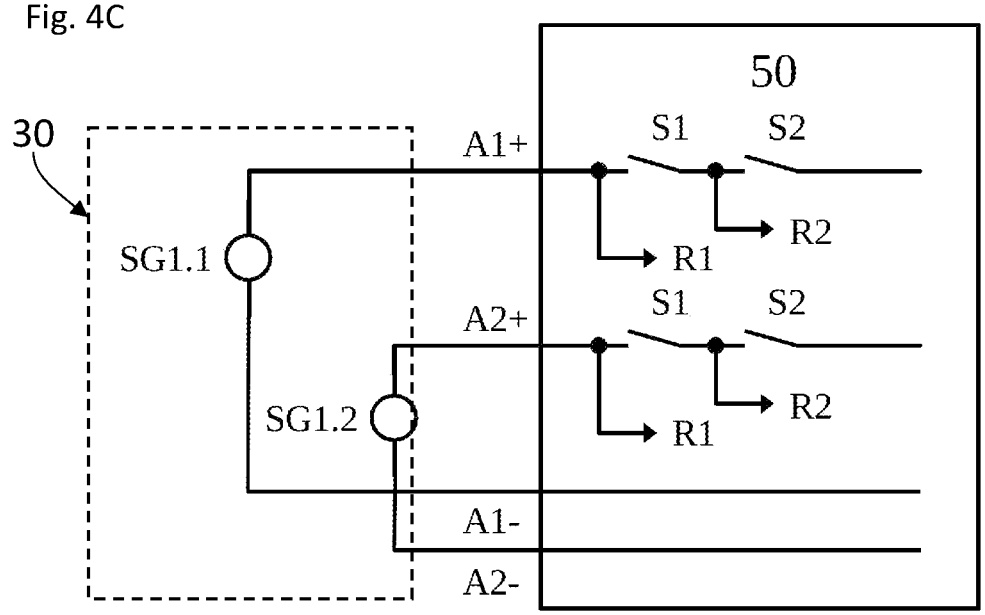

FIG. 4C shows a third example of the connection between the safety electronics 50 and the indicator unit 30. In order to be able to provide a guaranteed safe statement about the function of the at least one signal transducer SG1, . . . , SGn and thus to ensure the safe output of the indicator unit 30, multi-channel signal transducers SG1, ..., SGn, i.e., with at least two channels, can be used in one example. In this third example, the indicator unit 30 comprises a two-channel signal transducer SG1 with two channels SG1.1 and SG1.2. Each of the two channels SG1.1 and SG1.2 is controlled and monitored by the safety electronics 50 via its own safe outputs A1+, A1− and A2+, A2−. The monitoring of the safe outputs A1+, A1− and A2+, A2− takes place in each case via the positive strand A1+, A2+ via in each case two feedback R1, R2 in series.

Figure 4D:
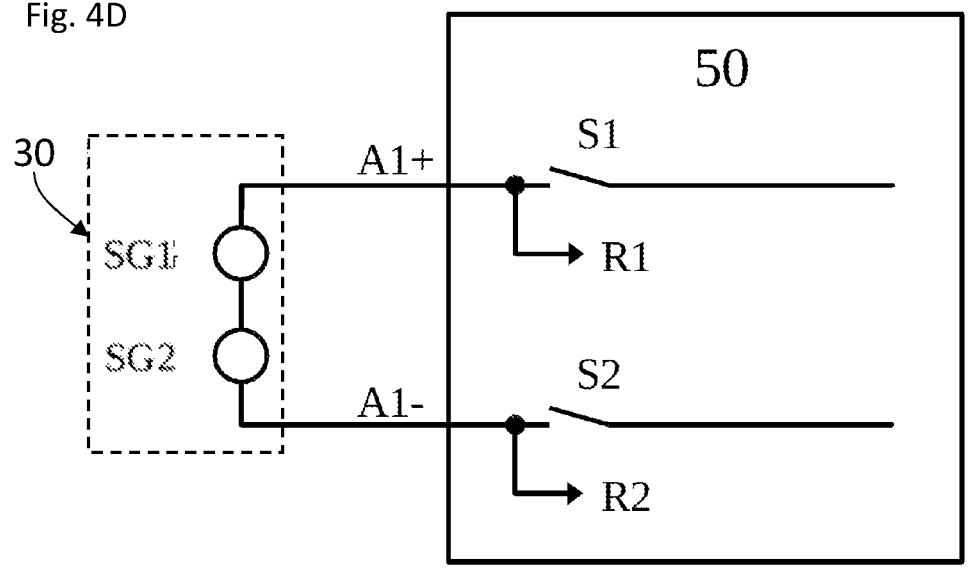

FIG. 4D shows a fourth example of the connection between the safety electronics 50 and the indicator unit 30, in which the indicator unit 30 comprises two signal transducers SG1, SG2. In this example, the switches S1, S2 are monitored as in the second example according to FIG. 4B.

Further examples and embodiments of the connection between the safety electronics 50 and the indicator unit 30 are possible, which results from a combination of single-channel or multi-channel signal transducers SG1, ..., SGn with safe outputs A1+, A1−, ..., An+, An− of the safety electronics 50. The selection of the connection between the safety electronics 50 and the indicator unit 30 can be made according to the SIL/PL values to be achieved or desired.

Figure 5A:
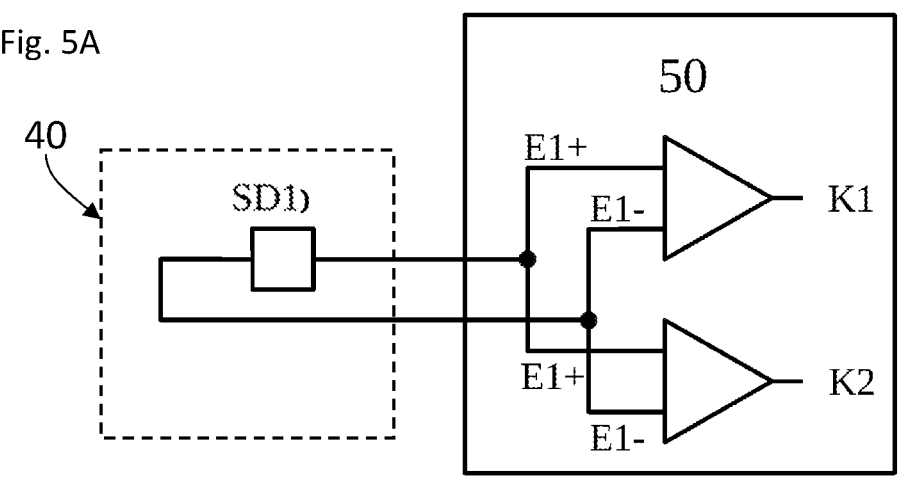
FIGS. 5A and 5B are schematic illustrations of the connection between safety electronics and the detection element.
Figure 5B:
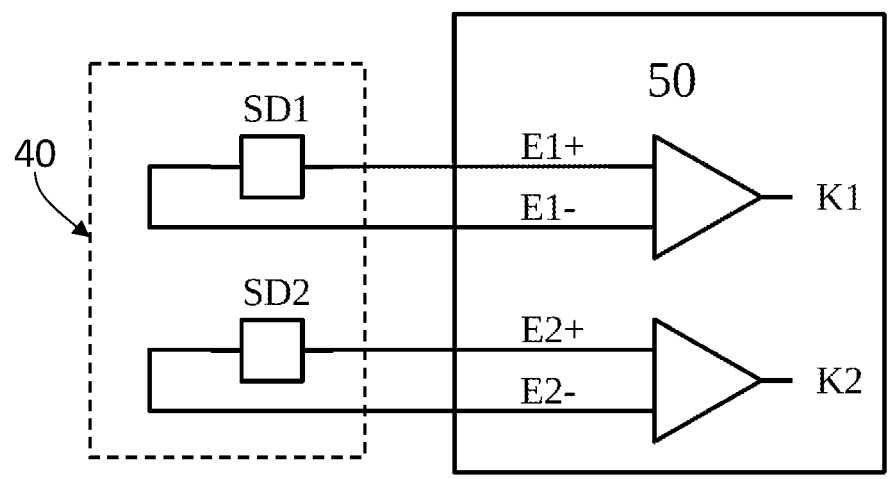

FIGS. 5A and 5B show examples of systems in which a safe input E1+, E1−, ..., En+, En− is provided in a single-channel or multi-channel manner via a connection between the safety electronics 50 and signal detectors SD1, ..., SDn of the detection element 40 in order to achieve a higher safety level or higher SIL/PL values.

FIG. 5A shows the connection of the safety electronics 50 to a detection element 40, comprising a signal detector SD1=SD with a two-channel monitoring of the safe input E1+, E1−. The signal detector SD1 is connected to the safe input E1+, E1− via a positive strand E1+ and a negative strand E1−, wherein the safe input E1+, E1− is divided into two channels K1 and K2 (two-channel). A higher reliability and safety is thereby achieved since faults in the safety electronics 50 can be reliably detected. Possible faults of the signal detector SD1 in connection with the signal transducer SG1, ..., SGn and its function can thus be detected. In a non-limiting example, the connection corresponds to a single-channel solution of the signal detector SD1 and a two-channel solution of the safety electronics 50.

FIG. 5B shows the connection of the safety electronics 50 to a detection element 40, comprising two signal detectors SD1 and SD2. The two signal detectors SD1 and SD2 are connected to the safe inputs E1+, E1− and E2+, E2− of the safety electronics 50 in a two-channel manner. Each of the two signal detectors SD1, SD2 is monitored independently of one another in a single-channel manner. This corresponds to a continuous two-channel system of signal detectors SD1, SD2 and safety electronics 50, whereby a substantially higher safety can be achieved.

Further examples and embodiments of the connection between the safety electronics 50 and the detection element 40 are possible, which result from a combination of safe inputs E1+, E1−, ..., En+, En− with a single-channel or multi-channel monitoring. The selection of the connection between the safety electronics 50 and the detection element 40 can be made according to the SIL/PL values to be achieved or desired.

The monitoring of the indicator unit 30 and of the detection element 40 by the safety electronics 50 thus represents a diagnostic function, which contributes significantly to the increase of the SIL/PL values.

Figure 6:
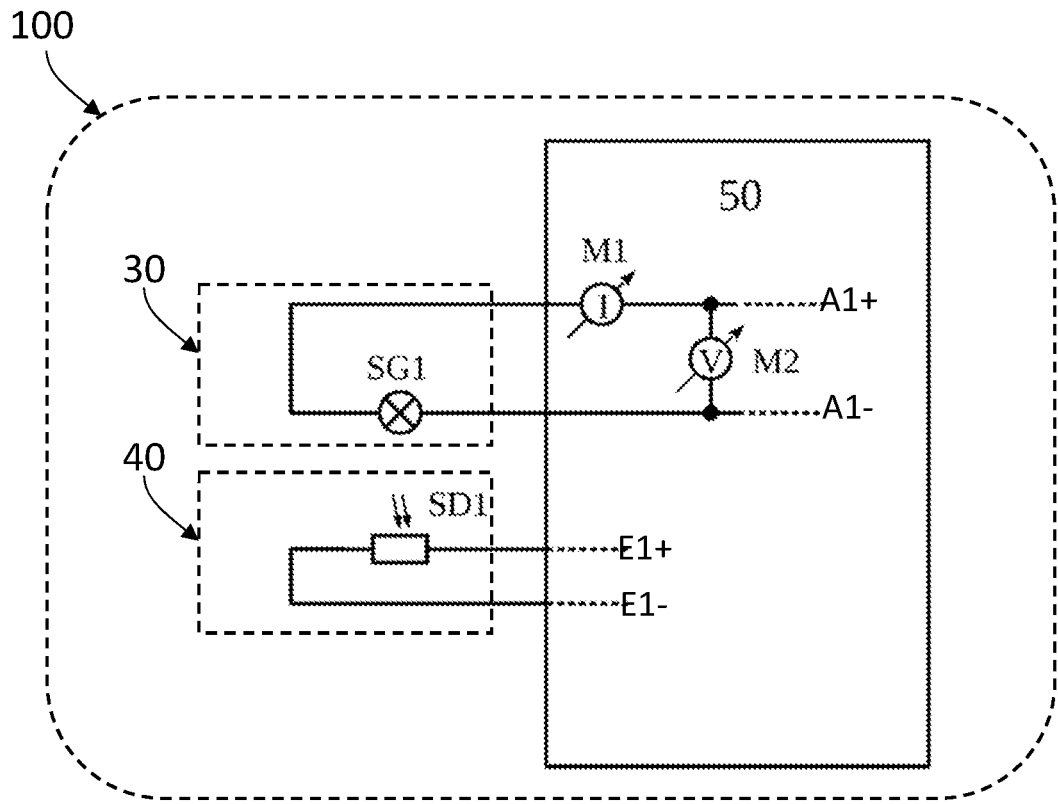
FIG. 6 is a schematic illustration of the connection between safety electronics and indicator unit or detection element corresponding to a first embodiment.

FIG. 6 is a schematic illustration of a part of the operating unit 100, in which the connection between safety electronics 50 and indicator unit 30 or detection element 40 corresponding to a first embodiment is illustrated. In this embodiment, the indicator unit 30 comprises a single signal transducer SG1, wherein the signal transducer SG1 is a lamp. The detection element 40 comprises a single signal detector SD1, wherein the signal detector is a photodiode. The photodiode detects a lighting of the lamp. In a further example, the operating unit 100 can include multiple signal transducers SGn and multiple signal detectors SDn.

The signal transducer SG1 is connected to the safety electronics 50 in a single-channel manner via the safe output A1+, A1−. In this example, the safety electronics 50 monitor the current with a first measuring device M1 and the voltage of the signal transducer SG1 at the safe output A1+, A1− with a second measuring device M2. The first measuring device M1 and the second measuring device M2 form the feedback R1. The feedback R1 can include at least one further signal alongside the current and/or the voltage or in addition to the current and/or the voltage. The signal detector SD1 is connected to the safety electronics 50 in a single-channel manner via the safe input E1+, E1−.

If the signal transducer SG1 outputs one of the functional state, the danger state and the position state or a change of the state as lighting information via the safety electronics 50, this lighting information is detected by the signal detector SD1 and is returned or fed back as a signal, comprising current and/or voltage, to the safety electronics 50 via the safe input En+, En−. Through this embodiment, the output of the signal transducer SG1 via the signal detector SD1 and thus the signal transducer SG1 itself is additionally monitored alongside the safe monitoring of the signal to the signal transducer SG1 via the safe output A1+, A1− and the safe monitoring of the signal from the signal detector SD1 via the safe input E1+, E1−. It can thereby be ensured with the highest safety level that the signal transducer SG1 and thus the indicator unit 30 has safely output the state of the plant 90 to the operator or that the indicator unit 30 has safely not output (incorrect) information to the operator. Since the indicator unit 30 is mounted at the operating unit 100 such that the operator always has the signal transducer SG1 in the field of vision, the operator can immediately perceive the change of state of the plant 90 and react quickly if required. In particular in the case of a present danger which is reported, for example, as red-lighting lighting information by the signal transducer SG1, the reaction time can be significantly reduced, whereby an overall plant safety is significantly increased. With this embodiment, the highest safety levels and consequently the highest SIL/PL values can thus be achieved.

Figure 7:
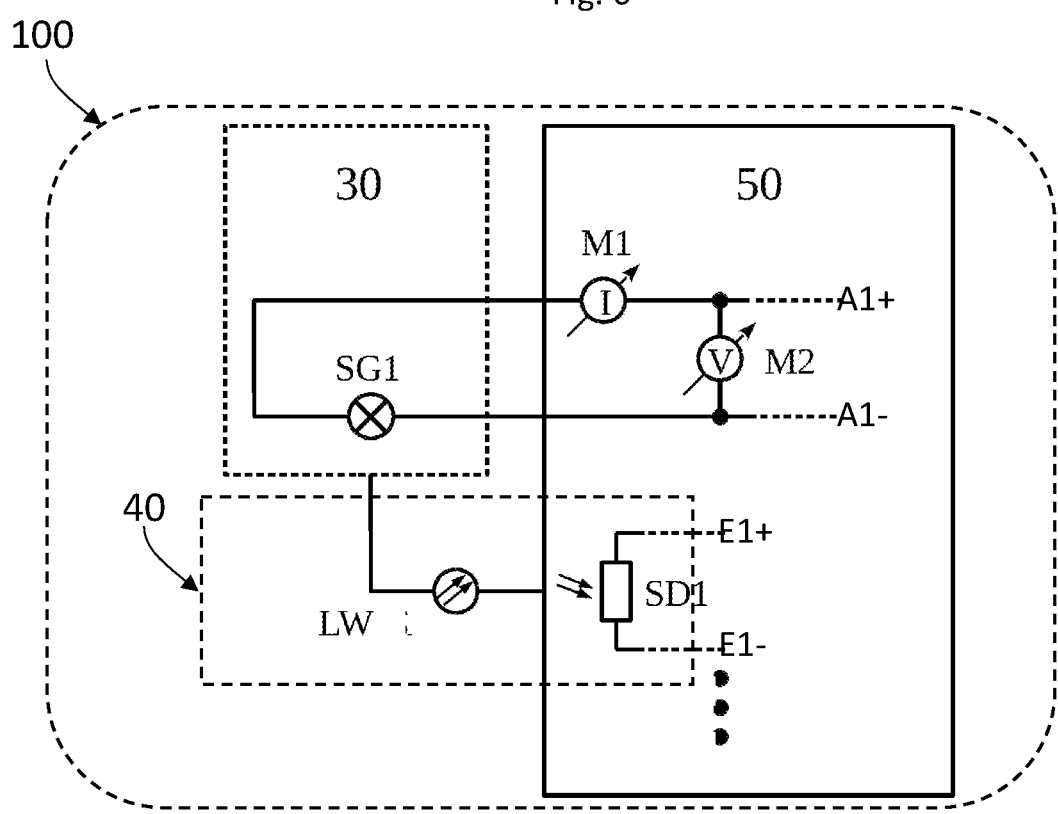
FIG. 7 is a schematic illustration of the connection between safety electronics and indicator unit or detection element corresponding to a second embodiment.

FIG. 7 shows a schematic illustration of a part of the operating unit 100, in which the connection between safety electronics 50 and detection element 40 is formed corresponding to a second embodiment. The structure of the operating unit 100 corresponding to the second exemplary embodiment differs from the structure of the operating unit 100 corresponding to the first exemplary embodiment in FIG. 6 only in that the detection element 40 comprises a fiber optic cable LWL and the signal detector SD1. The output of the indicator unit 30 as lighting information is conducted via the fiber optic cable LWL to the signal detector SD1, wherein the signal detector SD1 detects the signal or the output of the indicator unit 30. It is thereby possible to provide the signal detector SD1 at any position at the operating unit 100, whereby the shape and size of the operating unit 100 can be individually adapted. Identical components are identified with identical reference signs and will not be described again in detail for the sake of brevity.

The signal transducer SG1 can output an operational state of the operating unit 100 in a first example. If the operator selects the plant 90 from a plurality of plants via the second operating element 6 or the touch screen of the display 10, the signal transducer SG1 can output the connection establishment and the connection state. If the operating unit 100 and the plant 90 are connected, the signal transducer SG1 can output the functional state, a danger state or a position state of the plant 90. The output of the signal transducer SG1 as lamp is effected as lighting information, which in a non-exhaustive example comprises flashing, pulsing and changing of the brightness and color. As a result, the lighting information serves as an indicator for specific states of the operating unit 100 and/or plant 90 and for attracting attention. In one example, if the indicator unit 30 outputs a danger state via signal transducer SG1, the operator can reliably shut down the plant 90 via operating element 5 or the safety electronics 50 depending on the danger. In another example, in which the operator leaves a previously determined locally permissible area with the operating unit 100, the indicator unit 30 can output the information via the signal transducer SG1 by lighting information, for example flashing, that the locally permissible area, for example for the connection between the operating unit 100 and the plant 90, is left. In a further example, in which the power supply of the operating unit 100 is provided via batteries, the signal transducer SG1 can output lighting information indicating a low state of charge of the battery.

Figure 8:
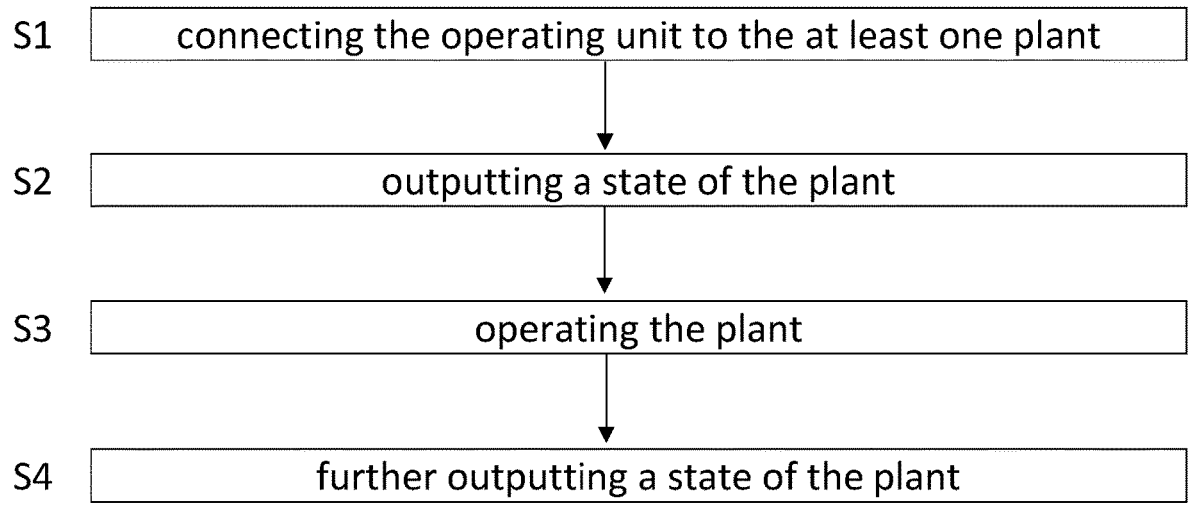
FIG. 8 is a flow chart of a method for operating at least one plant.

FIG. 8 shows a flow chart of a method for operating at least one plant 90 from a plurality of plants with the operating unit 100. In a first step S1, the operating unit 100 connects to the at least one plant 90 via the communication port 80 of the operating unit 100. The plant 90 can for example be a plant selected by the operator on the operating unit 100 via the second operating element 6 or touch screen of the display 10 before the connection S1 or a plant already stored in advance in a memory of the operating unit 100. The connection S1 is performed via a wired or wireless communication. When the operating unit 100 connects to the plant 90, communication between the operating unit 100 and the plant 90 is performed in real time or at intervals in the millisecond range. It can thereby be ensured that the state of the plant 90 is safely output in real time or with a barely noticeable delay by the indicator unit 30 in a second step S2.

The outputting S2 of the state of the plant 90 comprises one of the functional state, the danger state and the position state, which is performed via the indicator unit 30 of the operating unit 100 as at least one of the lighting information, acoustic information, and vibration information. The outputting S2 of the state of the plant 90 by the indicator unit 30 is monitored via the safety electronics 50 using the control and the feedback R1, R2 of the signal to the indicator unit 30. The outputting S2 via the safety electronics is monitored with safe outputs A1+, A1−, . . . , An+, An−, at least one signal transducer SG1, . . . , SGn, at least one signal detector SD1, . . . , SDn, and safe inputs E1+, E1−, . . . , En+, En−. If no danger is present and the operator is located with the operating unit 100 in the locally permissible area for the connection, the functional state is output S2, for example, by the indicator unit 30 as green lighting information and/or an acoustic signal indicating the proper function and connection between the operating unit 100 and the plant 90.

The operator can start or continue with the operation S3 of the plant 90 via the operating unit 100. During the operation S3 of the plant 90 via the operating unit 100, a further outputting S4 of the state of the plant 90 follows. The further outputting S4 of the state of the plant 90 in turn comprises one of the functional state, the danger state and the position state, which is performed via the indicator unit 30 as at least one of the lighting information, acoustic information, and vibration information. The further outputting S4 is continuously repeated during the connection or the communication between the operating unit 100 and the plant 90 in real time or at intervals in the millisecond range. It is thereby ensured that the state of the plant 90 is safely output in real time or with a barely noticeable delay by the indicator unit 30, which is monitored via the safety electronics 50 of the operating unit 100, by the further outputting S4.

Figure 9:
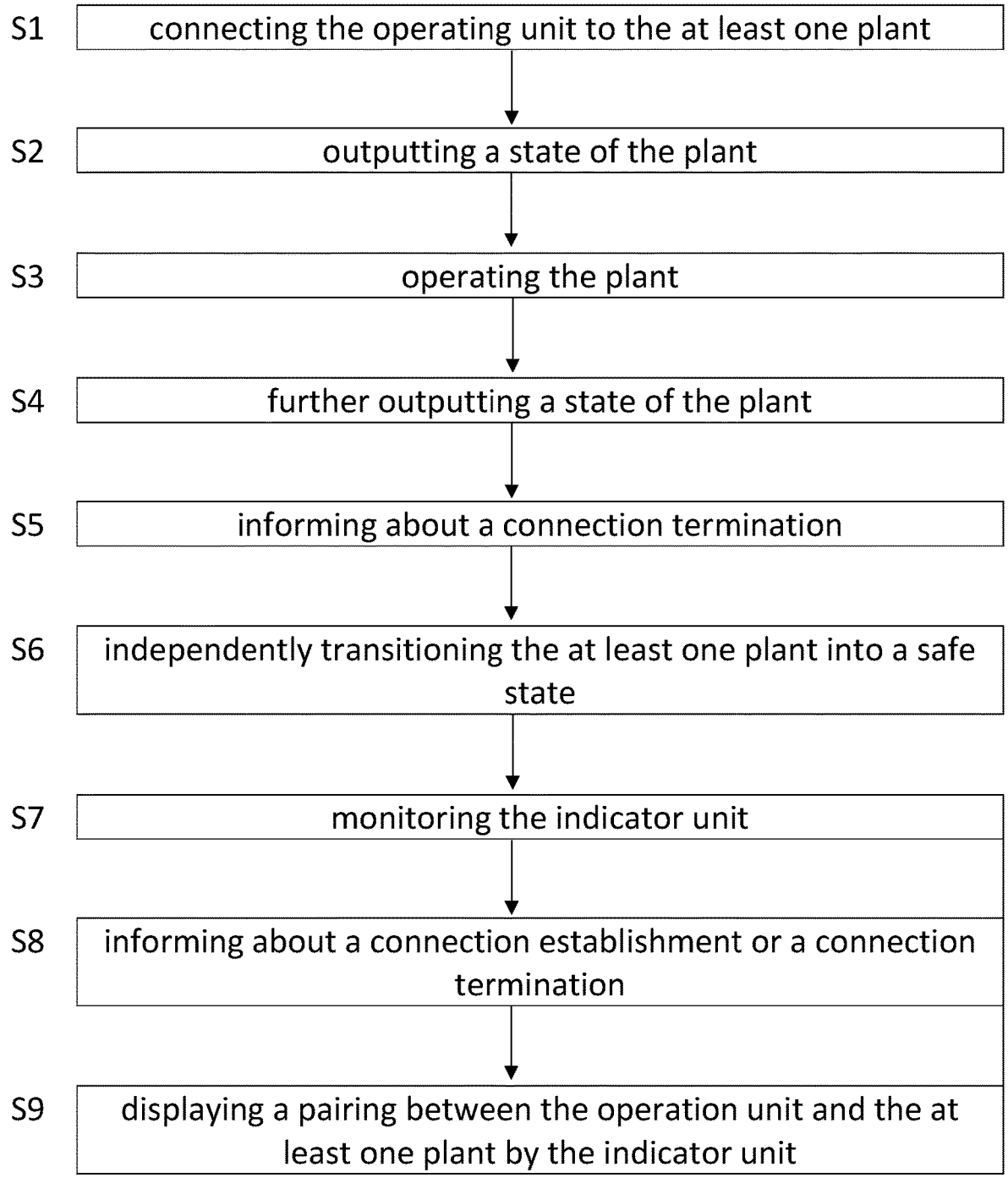
FIG. 9 is another flow chart of the method for operating at least one plant.

As seen in FIG. 9, the method for operating at least one plant 90 from a plurality of plants with the operating unit 100 further comprises informing S5 about a connection termination of the operating unit 100 to the at least one plant 90 via the indicator unit 30 of the operating unit 100. The indicator unit 30 informs S5 about the connection termination with a signal which is different from a signal reporting or reflecting the functional state, the danger state and the position state of the plant 90.

A connection termination occurs when the communication port 80 loses the connection/communication to the previously connected plant 90. Reasons for the connection termination can be, for example, the leaving of a locally permissible area by the user with the operating unit 100 or a low state of charge of the battery or a power supply termination of the plant 90 or operating unit 100. If the connection termination of the plant 90 to the operating unit 100 occurs, the plant 90 independently goes into a safe state via S6. The independent transitioning S6 of the plant into the safe state and the informing S5 are performed substantially simultaneously.

The method further comprises monitoring S7 of the indicator unit 30 via the safe output A1+, A1−, . . . , An+, An− of the safety electronics 50 of the operating unit 100. By monitoring S7 of the indicator unit 30, a high safety standard—high SIL or PL—can be achieved.

The method may further comprise informing S8 about a connection termination of the operating unit to the at least one plant via the indicator unit of the operating unit and independently transitioning the at least one plant into a safe state upon connection termination of the at least one plant to the operating unit, wherein the informing is performed with a signal different from a signal reflecting the functional state, the danger state and the position state of the at least one plant.

The method may further comprise the operating unit 100 displaying S9 the pairing between the operating unit 100 and the plant 90 by the indicator unit 30

According to the selection of the plant 90 from the plurality of plants (90), the operating unit 100 can be used for at least one plant 90 from the plurality of plants. In one example, the operating unit 100 can operate multiple plants in a manufacturing environment, such as a manufacturing hall.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and its practical application to enable one skilled in the art to utilize the invention in various embodiments as are suited to the particular use contemplated. It is intended that the scope of the invention be defined by the claims appended hereto and their equivalents.

| Reference signs | |
|---|---|
| 100 | operating unit |
| 5, 6 | operating element |
| 10 | display |
| 30 | indicator unit |
| 40 | detection element |
| 50 | safety electronics |
| 80 | communication port |
| 90 | plant |
| A1+, A1−, . . . , An+, An− | safe output(s) |
| E1+, E1−, . . . , En+, En− | safe input(s) |
| K1, K2 | channel |
| M1, M2 | measuring equipment |
| R1, R2 | feedback |
| S1, S2 | switch |
| SD1, . . . , SDn | signal detector(s) |
| SG1, . . . , SGn | signal transducer |

What is claimed is:

1. An operating unit for operating at least one plant from a plurality of plants, the operating unit comprising:
    a communication port for connecting the operating unit to the at least one plant;
    an indicator unit for outputting and for continuous repeated further outputting of a state of the at least one plant, wherein the indicator unit is provided at the operating unit; and
    safety electronics for monitoring the indicator unit during the outputting of the state of the at least one plant, comprising at least one safe input and at least one safe output, wherein the safety electronics are connected to the indicator unit via the at least one safe output and the safety electronics is connected to a detection element via the at least one safe input, wherein
    the detection element is configured to detect an output of the indicator unit, and wherein
    the state is at least one of a functional state, a danger state, and a position state.

2. The operating unit according to claim 1, wherein the safety electronics are connected to the indicator unit with the safe output via a feedback in a single-channel or multi-channel manner and the safety electronics are connected to the detection element with the safe input in a single-channel or multi-channel manner.

3. The operating unit according to claim 1, wherein the indicator unit comprises at least one signal transducer.

4. The operating unit according to claim 3, wherein each of the at least one signal transducer is respectively connected to the safety electronics via at least one safe output.

5. The operating unit according to claim 3, wherein the at least one signal transducer comprises at least one of a lamp, an acoustic transducer, and a vibration transducer.

6. The operating unit according to claim 5, wherein the lamp comprises a single lamp or a combined lamp.

7. The operating unit according to claim 1, wherein the indicator unit outputs the functional state, the danger state, and the position state of the at least one plant with one of lighting information, acoustic information, and vibration information.

8. The operating unit according to claim 3, wherein
    the detection element comprises at least one signal detector, and
    the number of signal detectors may differ from the number of signal transducers.

9. The operating unit according to claim 8, wherein the at least one signal detector comprises at least one of a photoresistor, a photodiode, a phototransistor, an acoustic sensor, and a vibration sensor.

10. The operating unit according to claim 8, wherein each signal detector is respectively connected to the safety electronics via at least one safe input.

11. The operating unit according to claim 1, wherein the operating unit is a component independent of the at least one plant or a part of the plant.

12. The operating unit according to claim 1, wherein the communication port communicates with the at least one plant in a wireless or wired manner.

13. The operating unit according to claim 1, further comprising:
    at least one operating element configured to operate the operating unit; and
    a display configured to display information about a state of the at least one plant and information about a state of the operating unit.

14. A method for operating at least one plant from a plurality of plants with an operating unit, the operating unit according to claim 1, the method comprising:
    connecting the operating unit to the at least one plant via a communication port of the operating unit;
    outputting a state of the at least one plant comprising one of a functional state, a danger state and a position state via an indicator unit of the operating unit as at least one of lighting information, acoustic information, and vibration information;
    operating the at least one plant via the operating unit; and
    further outputting a state of the at least one plant comprising one of the functional state, the danger state, and the position state via the indicator unit as at least one of the lighting information, acoustic information, and vibration information;
    wherein the further outputting is continuously repeated during the connection between the operating unit and the at least one plant, and
    wherein the indicator unit is monitored via safety electronics of the operating unit during the further outputting, wherein the safety electronics comprise a safe input and a safe output and the indicator unit is connected to the safety electronics via the at least one safe output.

15. The method according to claim 14, further comprising:
    informing about a connection termination of the operating unit to the at least one plant via the indicator unit of the operating unit; and
    independently transitioning the at least one plant into a safe state upon connection termination of the at least one plant to the operating unit;
    wherein the informing is performed with a signal different from a signal reflecting the functional state, the danger state, and the position state of the at least one plant.

16. The method according to claim 14, wherein the connecting is performed via a wired or wireless communication.

17. The method according to claim 14, wherein the outputting is monitored via the safety electronics via a control and a feedback of a signal to the indicator unit.

18. The method according to claim 14, wherein the outputting comprises information which comprises leaving of the operating unit a locally permissible area for the connection between the operating unit and the plant.

19. The method according to claim 14, further comprising:
   monitoring the indicator unit via the safe output of the safety electronics of the operating unit.

20. The method according to claim 14, further comprising:
   informing about a connection establishment or a connection termination between the operating unit and the at least one plant by the indicator unit.

21. The method according to claim 14, further comprising:
   displaying a pairing between the operation unit and the at least one plant by the indicator unit.

\* \* \* \* \*